(12) United States Patent
Oliver et al.

(10) Patent No.: US 9,038,835 B2
(45) Date of Patent: May 26, 2015

(54) CRANE MAT CARRIER

(71) Applicant: Total Support, LLC, Minooka, IL (US)

(72) Inventors: Andrew Stephen Oliver, Plainfield, IL (US); Wesley Steven Chellino, New Lenox, IL (US)

(73) Assignee: Total Support, LLC, Minooka, IL (US)

( * ) Notice: Subject to any disclaimer, the term of this patent is extended or adjusted under 35 U.S.C. 154(b) by 132 days.

(21) Appl. No.: 13/660,124

(22) Filed: Oct. 25, 2012

(65) Prior Publication Data

US 2013/0213920 A1    Aug. 22, 2013

Related U.S. Application Data

(60) Provisional application No. 61/601,646, filed on Feb. 22, 2012.

(51) Int. Cl.
  *B66C 23/78* (2006.01)
  *B66C 23/62* (2006.01)
  *B60R 9/00* (2006.01)

(52) U.S. Cl.
  CPC ............. *B66C 23/62* (2013.01); *B66C 23/78* (2013.01); *B60R 9/00* (2013.01)

(58) Field of Classification Search
  CPC ............. B66D 2700/035; B66D 2700/0378; B66D 23/78; B66D 23/26; B60R 9/00
  USPC ............................ 212/294, 302; 280/769, 163
  See application file for complete search history.

(56) References Cited

U.S. PATENT DOCUMENTS

| | | | |
|---|---|---|---|
| 1,116,039 A | 11/1914 | Dunham | |
| 1,506,274 A | 8/1924 | Specht | |
| 1,594,235 A | 7/1926 | Arndt | |
| 1,682,313 A | 8/1928 | Turner | |
| 1,792,586 A | 2/1931 | Higgins | |
| 2,541,244 A | 2/1951 | Hack | |
| 2,551,901 A * | 5/1951 | Richardson | 410/81 |
| 3,023,913 A | 6/1962 | Talbert | |
| 3,103,290 A * | 9/1963 | Perri | 414/462 |
| 3,158,301 A * | 11/1964 | Hedgepeth | 224/493 |
| 3,203,605 A | 8/1965 | Karl | |
| 3,365,214 A * | 1/1968 | Garnett | 280/763.1 |
| 3,510,146 A * | 5/1970 | Hartman | 280/491.5 |
| 3,754,777 A | 8/1973 | Riggs et al. | |
| 3,990,714 A | 11/1976 | Hornagold | |

(Continued)

OTHER PUBLICATIONS

PCT "International Search Report and PCT Written Opinion of the International Search Authority" of May 3, 2013 for International Application No. PCT/US 13/26690 of Total Support, LLC.

(Continued)

*Primary Examiner* — Emmanuel M Marcelo
*Assistant Examiner* — Justin Stefanon
(74) *Attorney, Agent, or Firm* — Tolpin & Partners, PC; Thomas W. Tolpin

(57) ABSTRACT

A user-friendly crane mat carrier is provided for conveniently transporting, storing and supporting crane mats, pads and other items. The economical light weight crane mat assembly can comprise a frame assembly with a main load-supporting bar, crossbars and perimeter bars. The special crane mat carrier can be easily connected to a crane, such as with a drawbar fixture, securing plate and locking plate. A hanger assembly with a suspension bar can be provided to hang the crane mat carrier. A latch mechanism can also be provided to securely lock the crane mat carrier.

11 Claims, 7 Drawing Sheets

(56) References Cited

U.S. PATENT DOCUMENTS

| | | | |
|---|---|---|---|
| 4,099,760 | A | 7/1978 | Mascotte et al. |
| 4,266,679 | A | 5/1981 | Juergens |
| 4,424,985 | A | 1/1984 | Holmes |
| 4,454,952 | A | 6/1984 | McGhie |
| 4,593,840 | A * | 6/1986 | Chown .................. 224/520 |
| 5,029,740 | A * | 7/1991 | Cox ....................... 224/484 |
| 5,092,503 | A | 3/1992 | Cocks |
| 5,803,475 | A * | 9/1998 | Dick ....................... 280/163 |
| 6,053,339 | A * | 4/2000 | Bellis, Jr. ................ 211/70.6 |
| 6,138,991 | A * | 10/2000 | Myers, Jr. ............... 254/323 |
| 6,659,484 | B2 * | 12/2003 | Knodle et al. ........... 280/166 |
| 6,769,858 | B1 | 8/2004 | Butler et al. |
| 7,114,736 | B2 * | 10/2006 | Stodola et al. .......... 280/164.1 |
| 7,338,077 | B2 | 3/2008 | Richard |
| 7,419,185 | B2 | 9/2008 | Richard |
| 7,428,762 | B1 | 9/2008 | Kalies |
| 7,503,572 | B2 * | 3/2009 | Park et al. .............. 280/163 |
| 7,806,308 | B2 * | 10/2010 | Gunn ..................... 224/514 |
| 7,828,118 | B2 * | 11/2010 | Barbara .................. 182/127 |
| 7,967,311 | B2 * | 6/2011 | Phillips .................. 280/166 |
| 8,424,886 | B2 * | 4/2013 | Mozo ..................... 280/47.371 |
| 2008/0048428 | A1 | 2/2008 | Richard |
| 2009/0008896 | A1 * | 1/2009 | Phillips .................. 280/166 |
| 2010/0270784 | A1 | 10/2010 | Blair |

OTHER PUBLICATIONS

Chellino, Wesley U.S. Appl. No. 12/252,165 for Crane Accessory Carrier, filed Oct. 15, 2008.

* cited by examiner

CRANE MAT CARRIER

CROSS REFERENCES TO RELATED APPLICATION

This application is based upon priority U.S. Provisional Patent Application No. 61/601,646 filed Feb. 22, 2012 for a Crane Accessory Carrying Device.

BACKGROUND OF THE INVENTION

1. Field of the Disclosure

The invention relates to cranes, and more particularly to a carrier for cranes to transport and carry crane mats and pads.

2. Background Art

Cranes are useful at construction and lifting sites for constructing buildings, bridges and other structures, as well as for lifting loads. Cranes are machines, generally equipped with a tower, derrick, hoist, wire ropes, chains, cables, pulleys and/or sheaves, that can be used to lift and lower materials (loads) and to move them horizontally. Cranes are mainly used for lifting heavy loads and transporting them to other places. Cranes are also used in the transport industry, such as on ships and loading docks for the loading and unloading of crates, supplies, products, and freight. Cranes are farther used in the petroleum industry and manufacturing industry for the assembling of drilling rigs and heavy equipment.

The basic crane can have a steel truss or telescopic boom on a mobile platform mounted on a stationary or mobile chassis on wheels or crawler threads. The boom can be hinged at the bottom and can either be raised or lowered by cables and/or hydraulic cylinders. Other types of crane include: a rough terrain (RT) crane, telescopic crane, tower crane, truck mounted crane, loader crane, overhead crane, wheel mounted crane, wheel-mounted crane with latticework boom, commercial truck-mounted crane with hydraulic boom, commercial truck-mounted crane with articulated boom, commercial truck-mounted crane with trolley boom, crawler mounted latticework boom crane, overhead track-mounted crane, monorail crane, underhung crane, straddle crane, hammerhead tower crane, all-terrain crane, dragline crane, gantry crane, tower crane, industrial crane, truck crane, crawler crane, carry deck crane, jib crane, aircraft carrier crane, and stiff-leg derrick crane, shipyard crane, loading dock crane, and outrigger crane.

Cranes for construction are often placed at a construction site, lifting site, or other job site for 9 months or more and can be stationary and fixed to the ground, or can be mobile and supported on wheels or crawler threads. Cranes can be controlled by a crane operator in a cab on the crane or remotely by radio frequency (RF) push button controls. Stationary cranes lack wheels or self-locomotion abilities, and they need to be physically transported.

Cranes are often temporarily located at construction sites, lifting sites, or other job sites. After performing lifting operations and other tasks for a limited time, a crane can be transported to another site for the next set of operations. In this way, crane operations can support many construction projects with a limited number of cranes. For these and other reasons, the setup and tear down operations for a crane can occur quite frequently.

A number of support or accessory devices are used in the setup of the crane. Some of these accessories are involved in blocking the wheels, while others are used to stabilize the crane. These accessories are generally directed to supporting the cranes in a safe, convenient, and effective manner.

Each setup operation generally involves movement of the crane to a desired location and then stabilization using outriggers, crane mats, and/or pads. Because the tires or crawler threads on a crane often do not provide the stability needed to keep the crane balanced, the use of outriggers, crane mats and/or pads is often helpful to keep the crane upright and from leaning too much to one side or the other. Outriggers can be attached to the crane and can be comprised of a beam, which is the leg of the outrigger. Outriggers can provide crane stability when positioned on crane mats or pads which can distribute the applied loads to the ground. Once the outriggers are extended at a desired distance from the crane, crane mats or pads can be positioned below the outriggers, wheels, and/or crawler threads to help level and stabilize the crane.

Since it is important that cranes be stable during the lifting operation so the cranes do not accidently overturn, various accessories such as crane mats and pads can be used to provide a load-distributing, stable or otherwise robust foundation, base, or layer from which cranes operate.

There are many types of crane mats and pads which can be used for a variety of purposes. Some examples include: steel, wood, plastic, and hardened rubber crane mats and pads which can be round, rectangular, and other shapes and can have handles or no handles.

Crane mats and pads can be used to support outriggers, wheels, and/or crawler threads of the crane. When construction occurs in uneven terrain, soft ground or on surfaces that are difficult for cranes to operate, crane mats and pads are used so that the crane has a solid foundation for support and stability. Construction sites, lifting sites, or other job sites can present a variety of ground conditions including wet or dry soil, mud, gravel, pavement, etc. Due to the heavy weight of the crane and loads carried by the crane, the crane mats and pads can help prevent shifting, tilting or sinking of the crane on the ground. Crane mats and pads can allow cranes to be used, transported, and moved over uneven surfaces, inhospitable landscapes, and other ground conditions.

Crane mats and pads can also be used with cranes that do not use outriggers. The crane mats and pads can be positioned underneath wheels, crawler threads, or other supports associated with the crane.

At some lifting sites, construction sites, or other job sites, the use of mats and/or pads is mandatory, thereby requiring the crane operators to haul the crane mats and pads with or to the crane. A large number of crane mats and pads are often transported with the crane between job sites. At a minimum, at least one crane mat or pad is generally used with each one of the outrigger feet, wheels, and/or crawler threads. Moreover, different types and sizes of crane mats and pads can be used to accommodate different ground surfaces and other site conditions. For these reasons, numerous crane mats and/or pads are usually transported with a crane.

Crane mats and pads are put under enormous loads, forces, and physical stress. Crane mats and pads bear the weight of massive cranes and loads. Since cranes are often placed over uneven ground surfaces, the weight and forces exerted on the crane mats and pads are not often evenly exerted or distributed.

The logistics of moving crane mats and pads are often complex and difficult. In the past, crane mats and/or pads have been transported and hauled on the deck of cranes or on trains, semi-trailer trucks, or other vehicles. Once at the lifting site, construction site, or other job site, the crane can be set up for lifting operations. This is burdensome and costly because it can require the use of additional vehicles and counter-balancing equipment. The set up operation involves having ready access to the crane mats and pads and placement of the crane mats and/or pads under the wheels, crawler threads, and/or outriggers.

There are many challenges with the use of crane mats and pads, such as the transportation, accessibility and storage of the crane mats and pads for use with the crane. Cranes have very little accessible space for carrying and transporting crane mats and pads. The placement of crane mats and pads on the deck of the crane itself can cause significant wear, tear, scratching, and damage to the deck of the crane surfaces and can sometimes interfere with operating structures such as rotation of the crane body relative to the platform. The crane mats and pads can also cause extensive damage when the crane mats and pads are dirty, or abrasive materials become lodged in the surface of the mats. For example, if the crane mats and pads are used on gravel or rocks, gravel, pebbles, and other grit can become embedded in the surface of the crane mats and pads and cause undesirable scratching and chipping of the deck of the crane when the crane mats and pads are placed on the deck. Moisture on the crane mats and pads can also cause rust and corrosion.

The weight of each crane mat and pad can be significant, typically at least 50-60 lbs., with some weighing as much as 300 lbs. Furthermore, crane mats and pads can be expensive and are expected to be used many times. As a result, the handling and transport of the crane mats and pads often is complicated, difficult and inconvenient. Cranes can be damaged, and crane crew members can become injured from complications arising from the handling, storage, and transportation of crane mats, pads, and other accessories.

Additional challenges result from the height of the deck of the crane. The crane operator and crew members often place, remove, or reach for the crane mats and pads over their heads onto the deck of the crane. Due to the substantial height of the deck of the crane above the ground, it is very difficult for the crane operator and crew to easily and comfortably place and remove the crane mats and pads on the deck of the crane. Insertion and removal of crane mats and pads from the crane deck can cause back injuries, muscle sprains, and other problems for the crane operator and crew. Furthermore, damage to the crane and its components, e.g. a pinched hose, can also result if the crane mats and pads are accidentally dropped onto other parts of the crane.

It is, therefore, desirable to provide an improved crane mat carrier, which overcomes most, if not all of the preceding problems.

BRIEF SUMMARY OF THE INVENTION

A special improved crane mat carrier is provided for conveniently transporting, storing, carrying and supporting crane mats, pads and other items. Advantageously, the novel crane mat carrier is easy to use, strong, sturdy, and durable. The improved crane mat carrier is effective, efficient, portable, light weight, and economical.

The user-friendly crane mat carrier can accommodate easier stacking, stowing, lifting and removing crane carrier mats and pads, while enhancing the safety and well being of crane operators, crane workers, and construction workers and avoiding lost-time accidents by minimizing back pain, muscle strain, and injuries to crane operator and workers previously resulting from overhead lifting and removal of crane mats and pads onto and from crane decks. The improved crane mat carrier is readily transportable and avoids the need to store and transport crane mats, pads and other items on the deck of the crane thereby decreasing scratching, scraping and other damage to the crane deck as well as reduce the frequency and extent of crane deck repairs.

The novel crane mat assembly can comprise a frame assembly with a main load-supporting bar, crossbars and perimeter bars which can provide a periphery. The special crane mat carrier can be easily connected to a crane or other construction equipment by a connection assembly, such as with a drawbar fixture, securing plate (mounting plate) and locking plate. A hanger assembly with a suspension bar can be provided to hang the crane mat carrier. A latch mechanism, preferably a special spring-loaded latching mechanism, can also be provided to securely lock the crane mat carrier.

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention.

Figure 14:
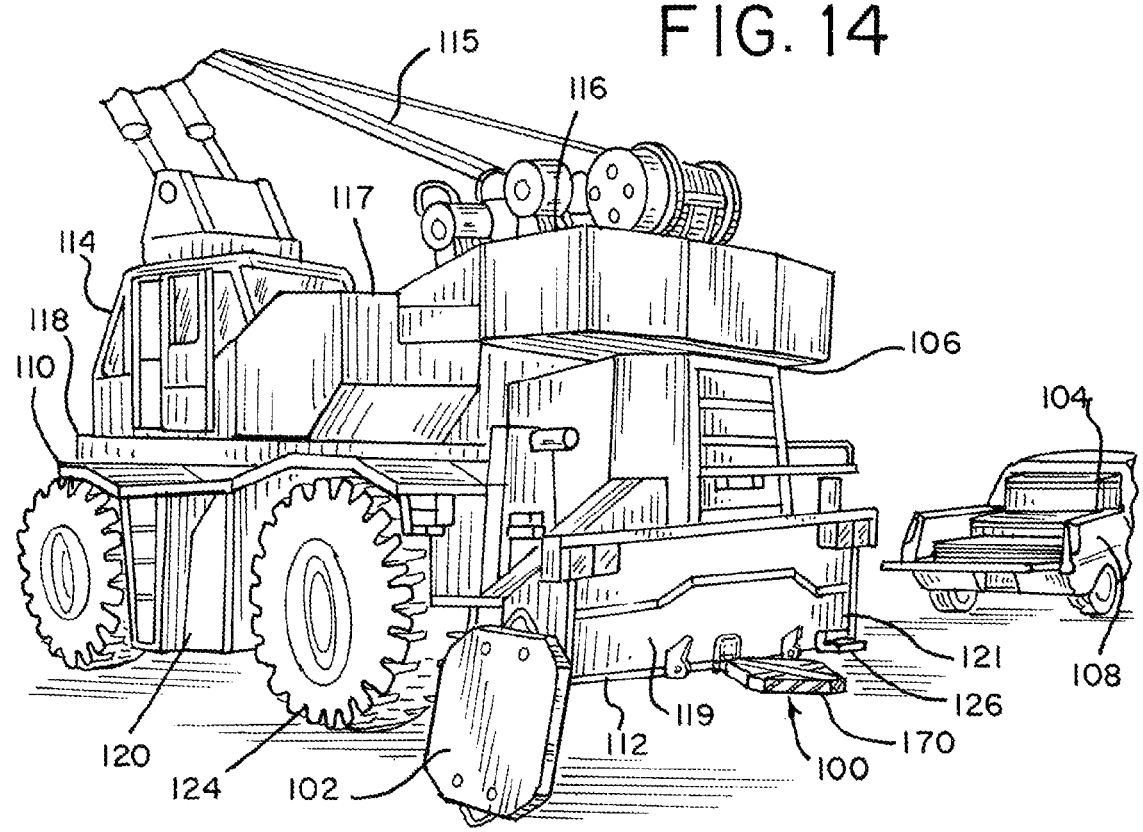
FIG. 14 is a fragmentary perspective view of a remote terrain crane with a crane mat carrier at lower horizontal supporting position and illustrating a crane stabilizing device comprising a rectangular crane pad with rope handles and chamfered beveled corners in accordance with principles of the present invention.

As shown in FIG. 14, a carrier system 100 can comprise a crane mat carrier system for transporting, storing and supporting stabilizer (stabilizing) devices 102 such as crane mats, crane pads and other items 104, which can comprise accessory items or accessories, for use with a crane 106 or other construction equipment 108 at the lift site, construction site, or other job site. The crane can have: a chassis 110 with an underside 112 providing a bottom, a cab 114 which can extend upwardly from the underside with controls for the operator to control and operate the boom 115 about a rotatable derrick 116 as well as control movement of the crane. The crane can also have a platform providing a deck 117, walls 118-121 which can extend upwardly from the bottom, and crane supports 124 for raising and elevating the underside of the crane aboveground. The walls of the crane can include: a front wall 118 providing a front end, a back wall 119 providing a back end, and elongated side walls 120 and 121 which can extend longitudinally between and integrally connect the ends of the crane. The walls can each comprise a wall surface. At least one of the surfaces of the ends of the crane can comprise a mounting surface 126 which can be located and positioned in proximity to the underside of the crane. The crane supports which can raise and elevate the underside of the crane aboveground, and can comprise outriggers and wheeled supports for moving the crane. The wheeled supports can comprise: wheels, tires, crawler tracks, and combinations thereof. At the lift site, construction site, or other job site the crane mats, crane pads or other crane-stabilizer devices can be placed and positioned below the outriggers and/or wheeled supports of the crane to support and stabilize the crane during use or when parked.

Figure 1:
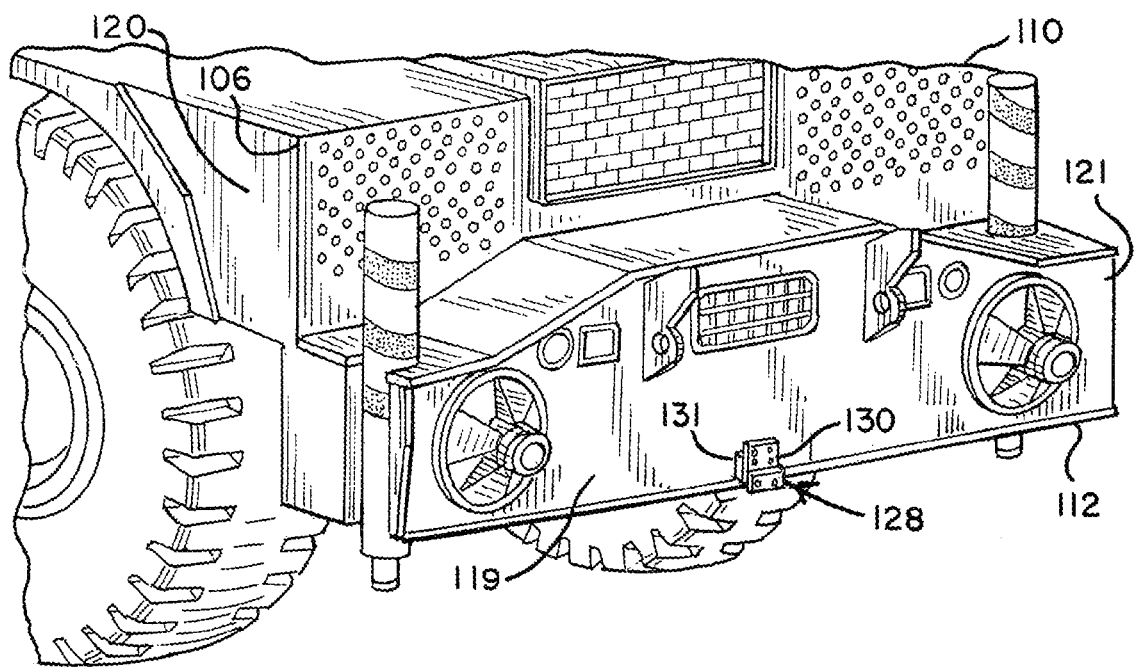
FIG. 1 is a perspective view of a back end of a crane with a drawbar fixture comprising a backing plate and a mounting securing plate in accordance with principles of the present invention.
Figure 2:
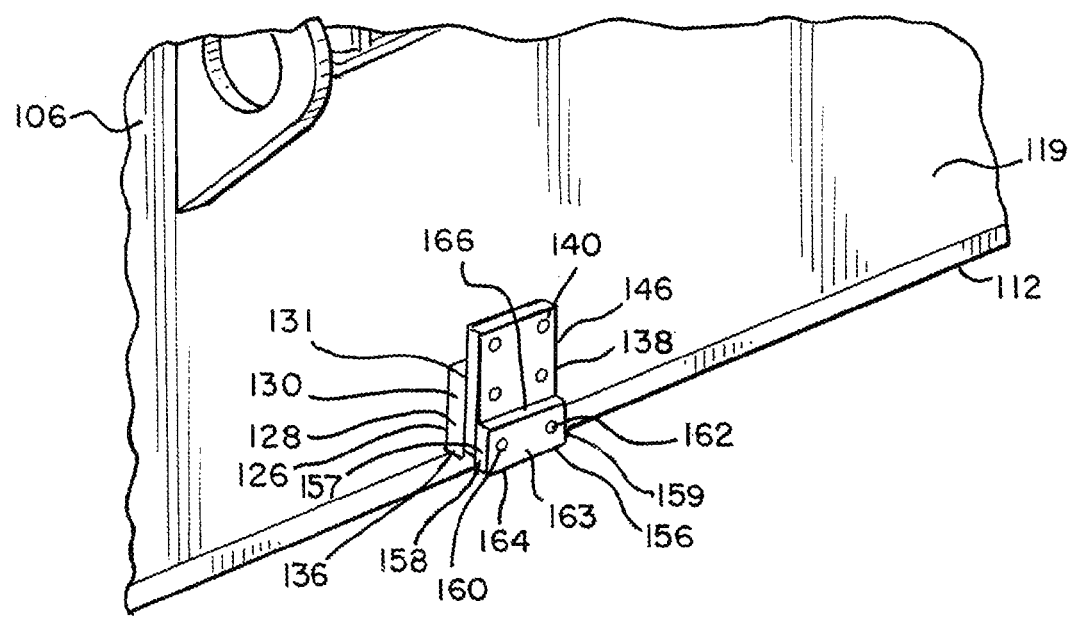
FIG. 2 is a perspective view of a back end of a crane with a drawbar fixture comprising a backing plate, a mounting securing plate and a locking plate in accordance with principles of the present invention.
Figure 3:
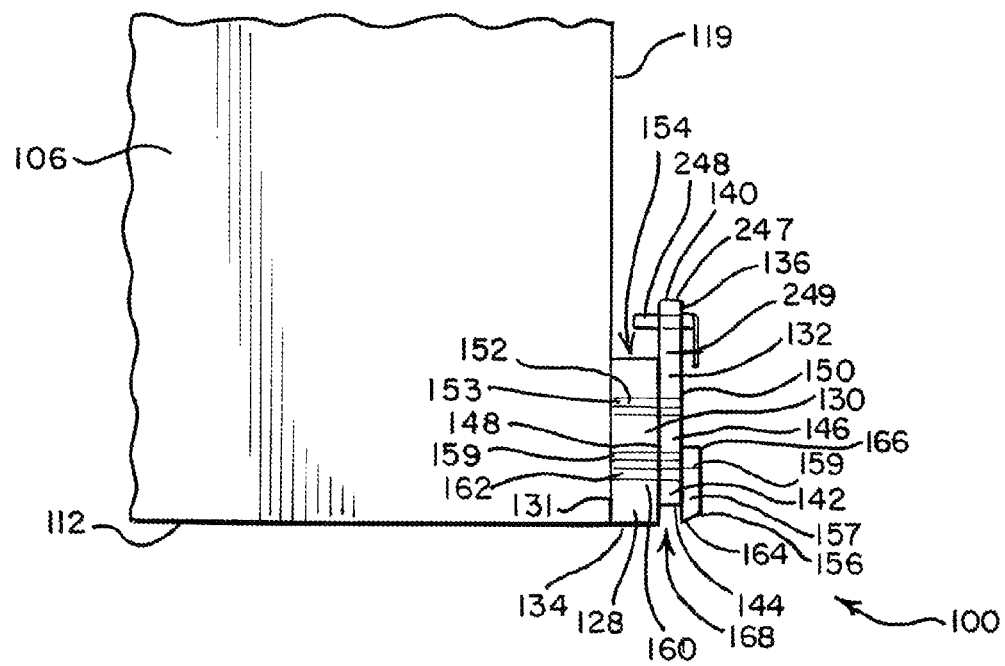
FIG. 3 is a diagrammatic side view of a crane with a drawbar fixture comprising a backing plate, a mounting securing plate and a locking plate with fasteners such as bolts and detent pins comprising pull pins with rings in accordance with principles of the present invention.

As shown in FIGS. 1-3, a drawbar fixture 128 comprising a backplate 130 providing a backer plate can be secured to the mounting surface of the crane. The backplate can have an outer backplate surface 131 (FIG. 3), a backplate top 132 and a backplate bottom 134. A mounting securing plate 136, also referred to as a securing plate or mounting plate, can have an upper securing plate portion 138 with an upper end 140 (FIG. 3) which can extend to a height above the top of the backplate and can have a lower securing plate portion 142 with a lower end 144 which can be positioned at a height above the bottom of the backplate. The mounting securing plate can have an intermediate securing plate portion 146 which can extend between and integrally connect the lower securing plate portion and the upper securing plate portion. The mounting securing plate can have a back mounting surface 148 (FIG. 3) which can face toward an adjacent end wall of the crane and can have a front mounting surface 150 which can face outwardly away from the adjacent end wall of the crane. The back mounting surface of the intermediate and lower securing plate portions can abut against and be secured by bolts 152 or other fasteners via bolt holes 153 to the outer backplate surface of the backplate. The upper securing plate portion of the mounting securing plate can be positioned and spaced outwardly from the mounting surface and the adjacent end wall of the crane and can cooperate with the backplate and the adjacent end wall of the crane to form a suspension-rod receiving slot 154 therebetween.

As shown in FIGS. 2 and 3, a locking plate 156 can be provided with an inner locking plate surface 157 which can face inwardly, an outer locking plate surface 158 which can face away from the mounting securing plate, a locking plate-abutment portion 159 which can abut against and be secured to the lower plate portion of the mounting securing plate by bolts 160 or other fasteners via fastener-receiving openings comprising bolt holes 162 in the mounting plate and locking plate, and a downwardly extending locking plate portion 163 which can extend integrally downwardly from the locking plate-abutment portion. The locking plate can have a lower edge 164 that can be positioned at a level below the lower end of the mounting securing plate and can have an upper edge 166 that can be positioned at a height below the upper end of the mounting securing plate and the top of the backplate. The downwardly ending locking plate portion can be spaced away from the adjacent end wall of the crane and the backing plate to form a locking bar-receiving slot 168 therebetween.

Figure 4:
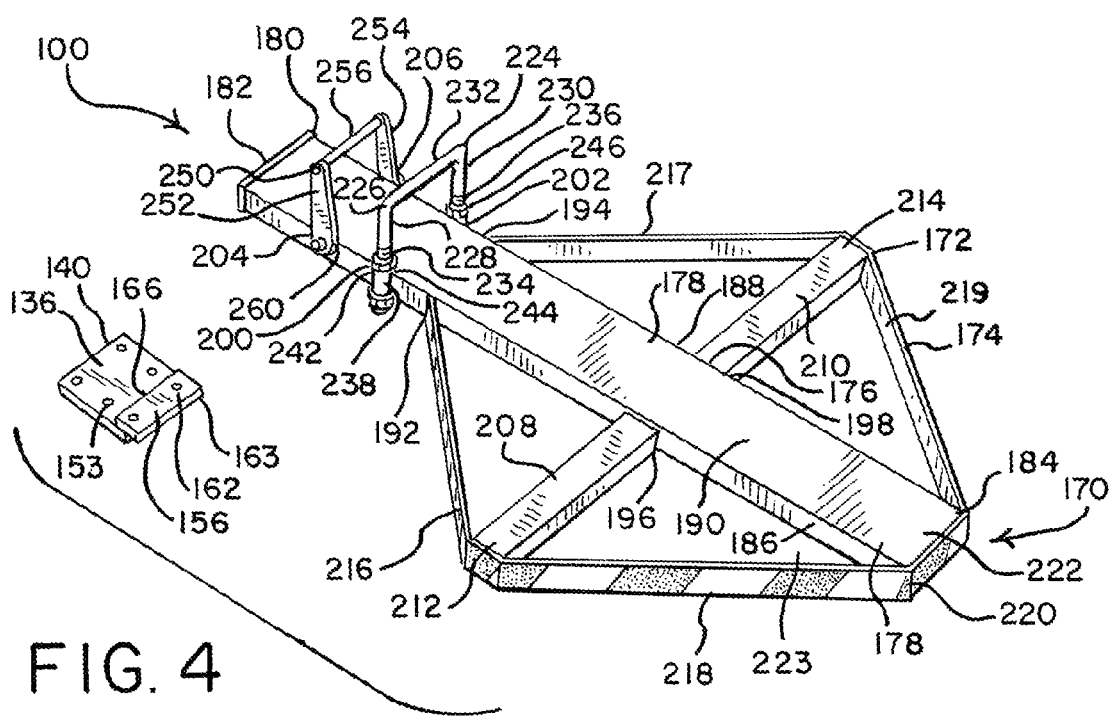
FIG. 4 is a reduced perspective assembly view of a crane mat carrier and a mounting securing plate and a locking plate in accordance with principles of the present invention.
Figure 5:
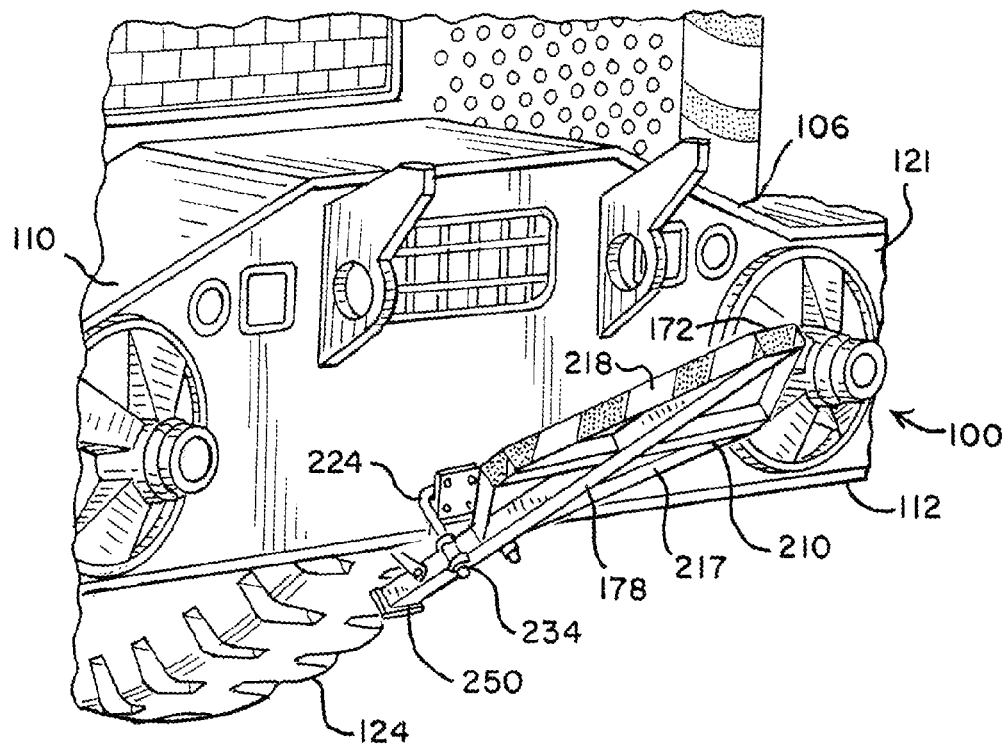
FIG. 5 is a perspective view of a back end of a crane with a crane mat carrier at an intermediate position at an angle of inclination and being secured by a hanger assembly, latch mechanism, mounting securing plate and a locking plate in accordance with principles of the present invention.
Figure 6:
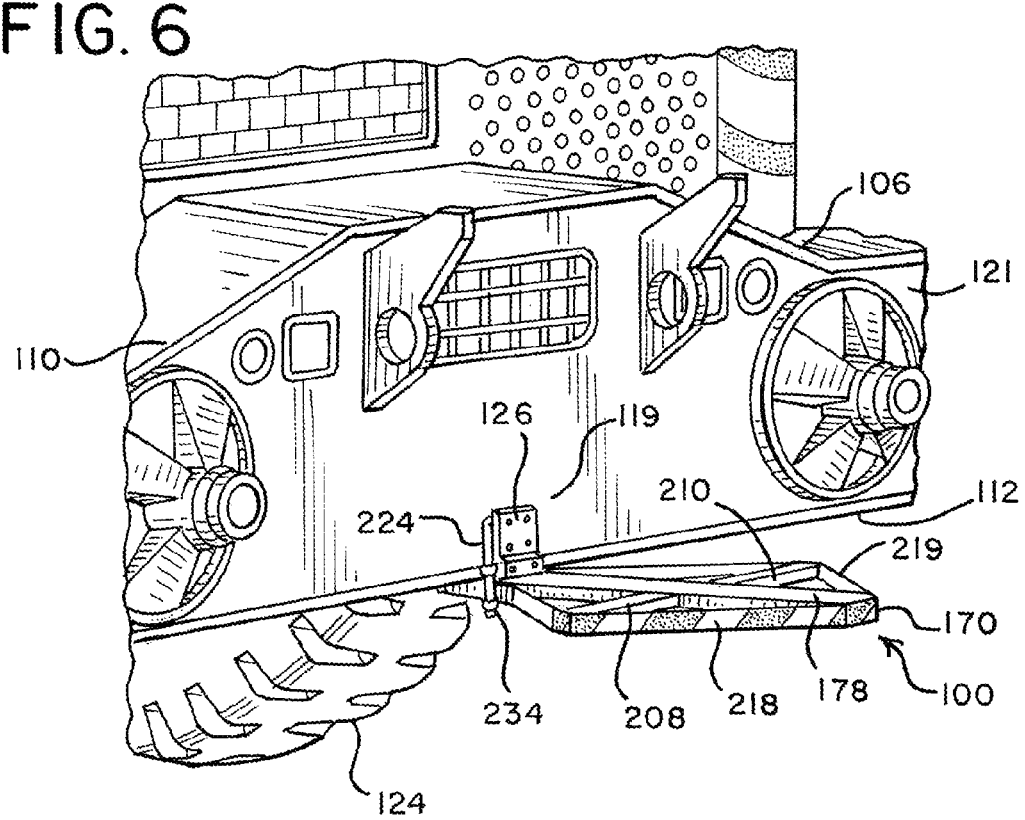
FIG. 6 is a perspective view of a back end of a crane with a crane mat carrier at a lower horizontal supporting position and being secured by a hanger assembly, mounting securing plate and a locking plate in accordance with principles of the present invention.
Figure 7:
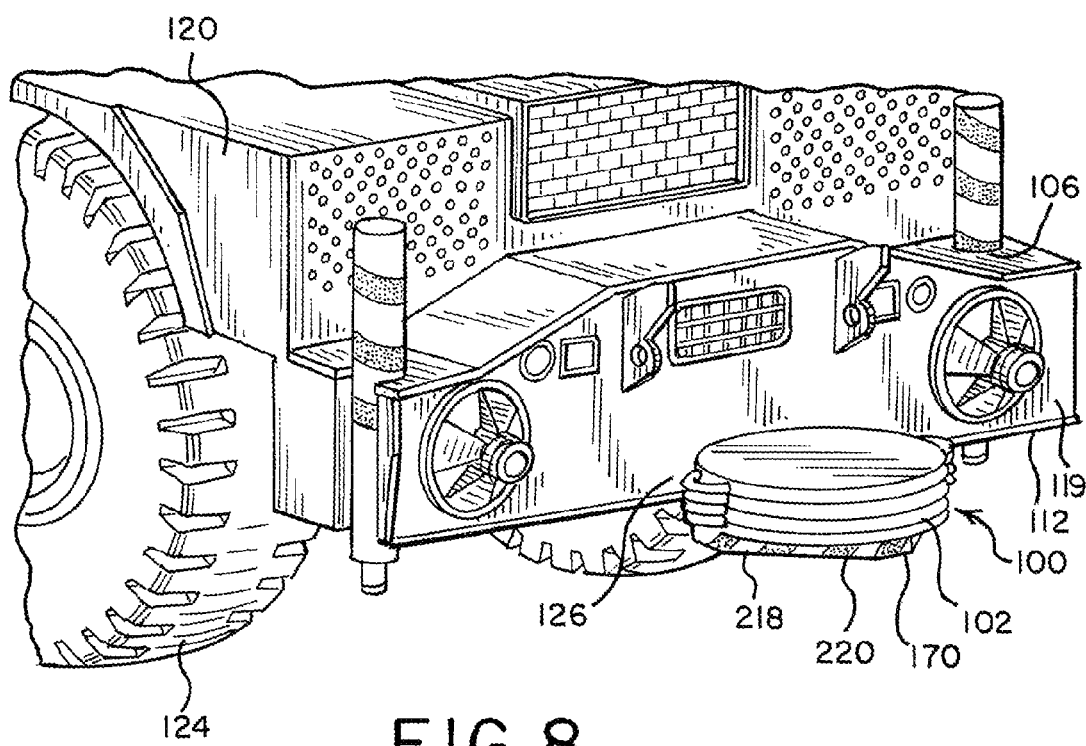
FIG. 7 is a perspective view similar to FIG. 6 and illustrating a stack of stabilizer devices comprising circular crane pads with handles supported and stacked upon the crane mat carrier.
Figure 8:
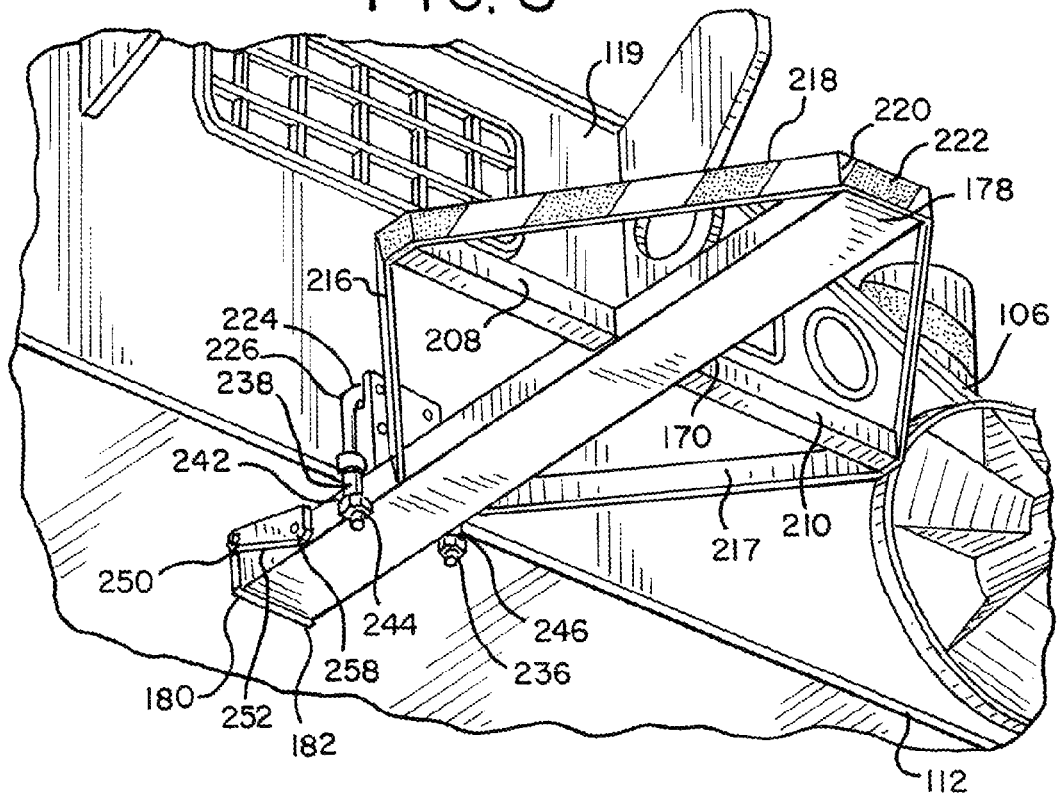
FIG. 8 is a bottom perspective view of a back end of a crane with a crane mat carrier at a lower horizontal supporting position and being secured by a hanger assembly, mounting securing plate and a locking plate in accordance with principles of the present invention.
Figure 13:
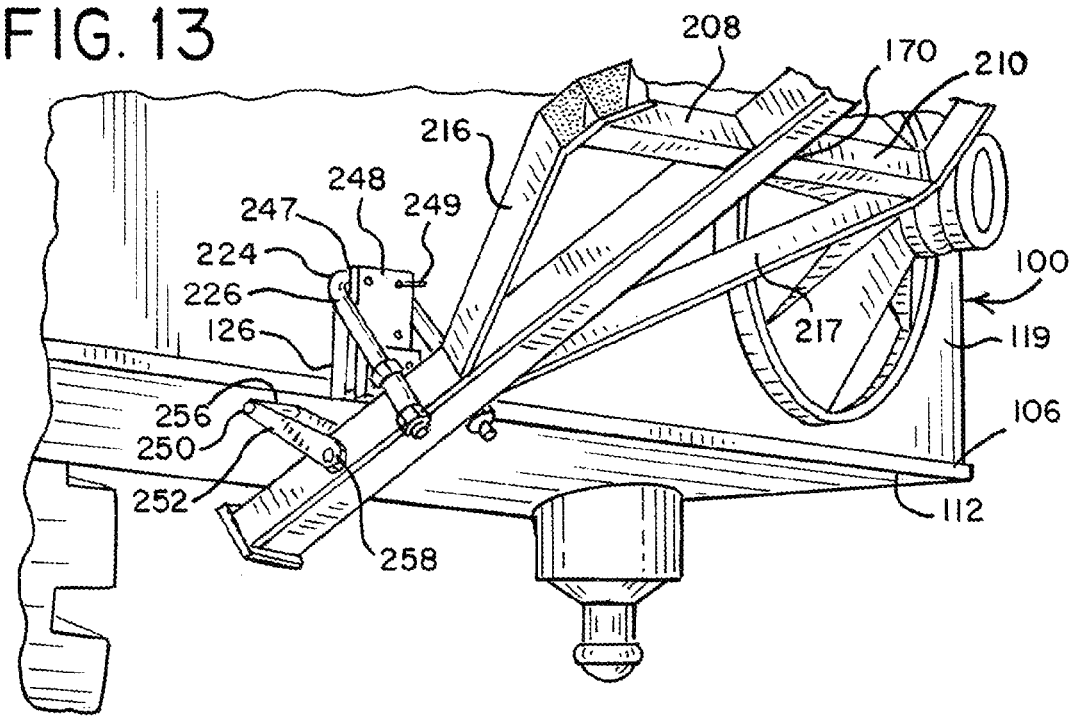
FIG. 13 is a fragmentary perspective view of a crane mat carrier at an intermediate position at an angle of inclination and being secured by a hanger assembly and latch mechanism at the back end of the crane along with a mounting securing plate and a locking plate in accordance with principles of the present invention.

The carrier system can comprise a load-bearing crane mat carrier 170 (FIG. 4) for transporting, carrying, engaging and supporting the stabilizer devices on the crane. The crane mat carrier can comprise a removable crane mat carrier and/or detachable pad holder. The crane mat carrier can be moveable from a upright storage position (FIGS. 10 and 11) to a lower generally horizontal supporting position (FIGS. 6, 7, 8 and 12) and vice versa. The crane mat carrier can also be moveable to an intermediate position (FIGS. 5 and 13) at an angle of inclination between the upright storage position and the horizontal support position.

The crane mat carrier can comprise a frame assembly 172 (FIG. 4) providing a loading bearing frame 174 with a load-supporting surface 176. The frame assembly can comprise an elongated main longitudinal load-supporting bar 178 which can extend longitudinally outwardly and be cantilevered front the crane in the horizontal supporting position. The main longitudinal load-supporting bar can have an inner end 180 which can be positioned below the underside of the crane in the horizontal supporting position. A rectangular load distribution stability plate 182 can be positioned and abut against and be secured to the inner end of the longitudinal bar. The main longitudinal load-supporting bar can have an outer end 184 which can be positioned opposite the inner end and extend outwardly from the crane when the crane mat carrier is in the horizontal supporting position.

The main longitudinal load-supporting bar can have longitudinal side portions 186 and 188 (FIG. 4) and a longitudinal load-supporting surface 190 which can extend between and integrally connect the longitudinal side portions. The main longitudinal load-supporting bar can also have inner peripheral bars-engaging portions 192 and 194 and can have cross-bars-engaging portions 196 and 198 which can be positioned between the peripheral bars-engaging portions and the outer end of the longitudinal bar. The main longitudinal load-supporting bar can further have hanger sleeve-engaging portions 200 and 202 which be located between the inner peripheral bars-engaging portions and the inner end of the longitudinal bar. The main longitudinal load-supporting can also have latch-engaging portions 204 and 206 which can be located between the hanger sleeve-engaging portions and the inner end of the longitudinal bar.

The frame assembly of the crane mat carrier can have crossbars 208 and 210 (FIG. 4) which can provide lateral load-stabilizing ribs that are welded or otherwise secured to and extend laterally and transversely from the crossbars-engaging portions of the main longitudinal load-supporting bar between the inner and outer ends of the main longitudinal load-supporting bar. The crossbars can have opposite lateral ends 212 and 214. The frame assembly of the crane mat carrier can also have can also have perimeter bars 216-219 which can provide a generally diamond-shaped periphery 220. The perimeter bars can comprise diagonal braces including inner diagonal braces 216 and 217 which can extend between and connect the lateral ends of the crossbars to and converge towards the inner peripheral bars-engaging portions of the main longitudinal load-supporting bar and can include outer diagonal braces 218 and 219 which can extend between and connect the lateral ends of the crossbars to and converge towards the outer end of the main longitudinal load-supporting bar. The outer diagonal braces can have outer surfaces with indicia thereon providing reflectors 220 for enhanced visibility and viewing of the crane mat carrier in the supporting position.

The longitudinal bar, crossbars and perimeter bars have substantially coplanar stabilizer device-engaging portions 222 (FIG. 4) which can provide substantially coplanar stabilizer device-supporting surfaces for transporting, holding, carrying and supporting the crane-stabilizer devices. The stabilizer device engaging portions can also comprise item-supporting portions for transporting, holding, carrying and supporting other items. Each of the bars can comprise a metal bar, such as: a tubular bar, channel, solid bar, perforated bar, foraminous bar, rigid bar, or combinations of the preceding. In the illustrated embodiment, the main longitudinal bar and crossbars comprise tubular bars. The frame and frame assembly can have generally triangular openings providing generally triangular passageways 223 between the peripheral bars, crossbars, and the main longitudinal bar for decreasing the weight of the crane mat carrier and accommodating passage of air and debris.

The crane mat carrier can include a hanger assembly 224 (FIG. 4) for hanging and supporting the crane mat carrier on the backing plate, the mounting securing plate and the adjacent end wall of the crane. The hanger assembly can include an inverted generally U-shaped hanger 226 (FIGS. 4, 8, 12 and 13) which can comprise and provide an inverted generally U-shaped suspension rod. The hanger can have hanger-legs 228 and 230 which can extend downwardly when the crane mat carrier is in the generally horizontal supporting position and can have an transverse suspension hanger bar 232 which can extend laterally and transversely between and integrally connect the legs and can be positioned in the suspension-rod receiving slot. The legs can have externally threaded lower leg portions 234 and 236. The hanger assembly can have tubular hanger sleeves 238 and 240 which can be welded or otherwise secured to the hanger sleeve-engaging portions of the main longitudinal load-supporting bar. The sleeve can be positioned generally upwardly when the crane mat carrier is in the generally horizontal supporting position and can have upper sleeve portions and lower sleeve portions. The tubular hanger sleeves can have leg-openings 242 for receiving the lower leg portions of the legs. The hanger assembly can also have internally threaded hanger adjustment nuts 244 and 246 for engaging and securing the lower legs portions against the upper and lower sleeve portions of the sleeve.

The upper securing plate portion of the mounting securing plate can have detent openings 247 (FIGS. 3, 12 and 13) for receiving detent pins 248. The detent pins can comprise pull pins with finger-graspable rings 249 for detachably securing the latching bar comprising the suspension rod in the suspension-rod receiving slot.

Figure 10:
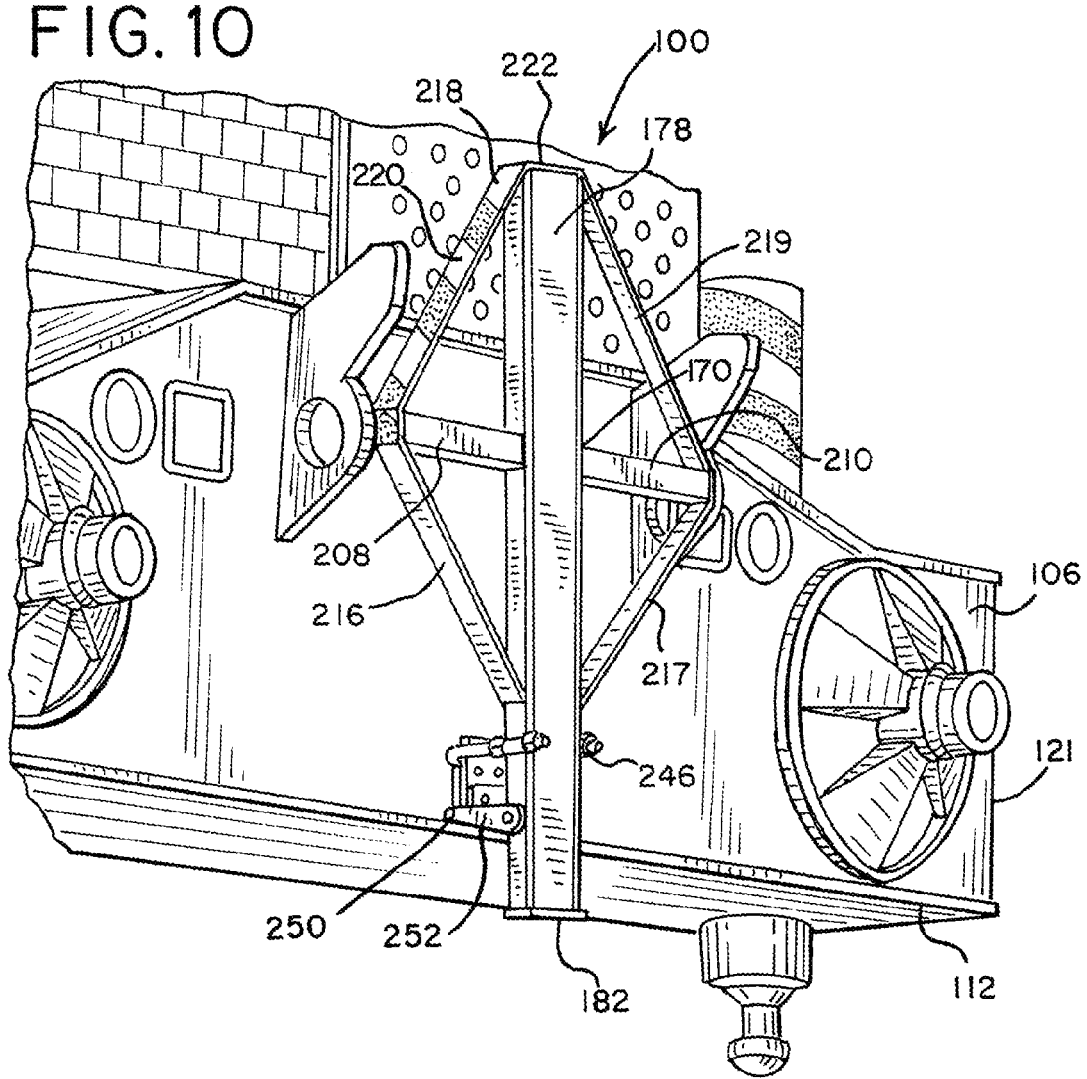
FIG. 10 is a perspective view of a back end of a crane with a crane mat carrier at an upright storage position and being secured by a hanger assembly, latch mechanism, mounting securing plate and a locking plate in accordance with principles of the present invention.
Figure 11:
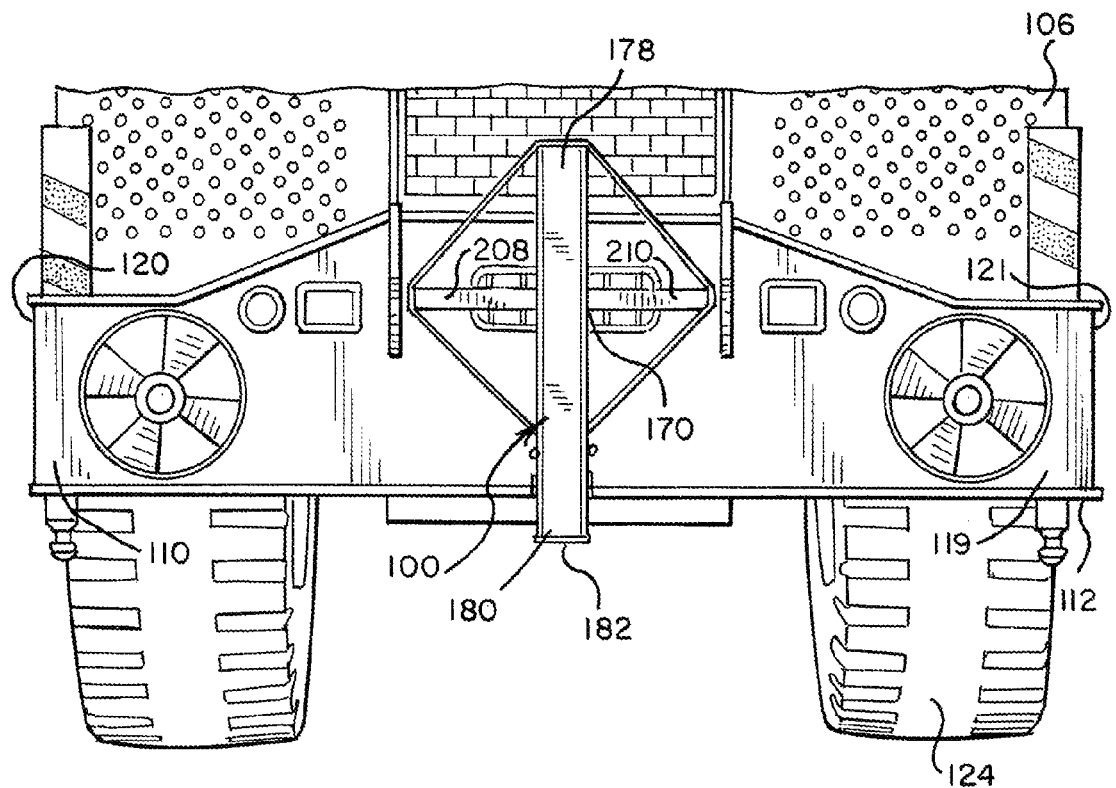
FIG. 11 is a back view of the back end of a crane with a crane mat carrier at an upright storage position and being secured by a hanger assembly, latch mechanism, mounting securing plate and a locking plate in accordance with principles of the present invention.
Figure 12:
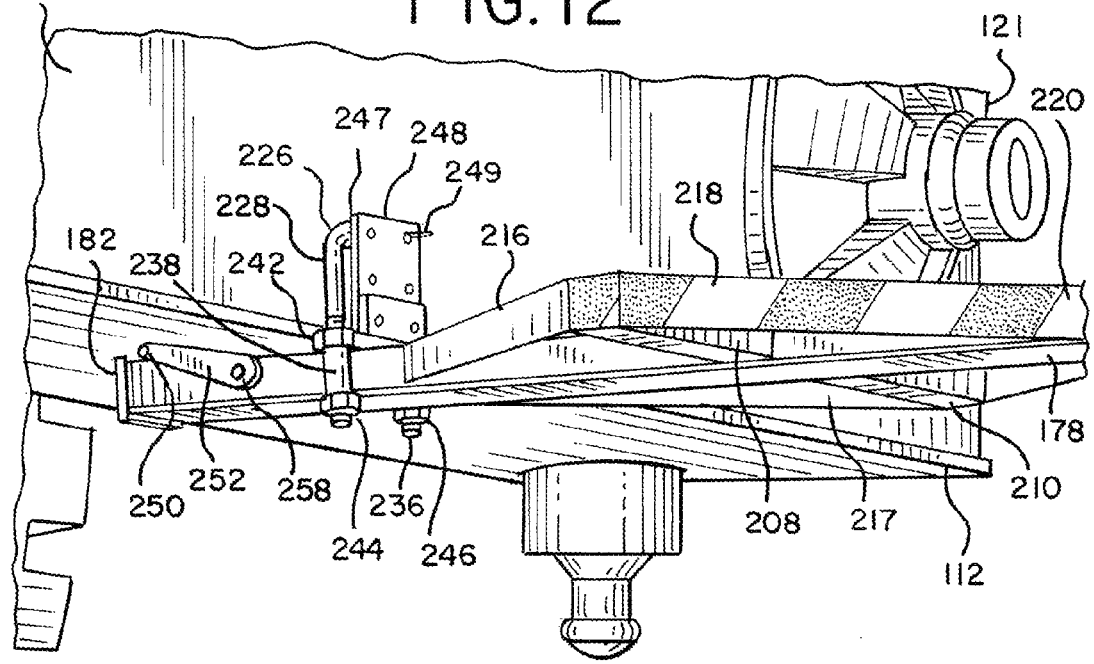
FIG. 12 is a fragmentary perspective view of a crane mat carrier at a lower horizontal supporting position and being secured by a hanger assembly by detent pins comprising pull pins with rings at the back end of the crane along with a mounting securing plate and a locking plate in accordance with principles of the present invention.

The crane mat carrier can also have a safety latch mechanism 250 (FIGS. 4, 8, 10, 12 and 13) for securing, locking, and supporting the crane mat carrier against a bottom portion of the back plate, the mounting securing plate and the adjacent end wall of the crane when the crane mat carrier is in the upright storage position. The safety latch mechanism can comprise spring-loaded latches 252 and 254 which can provide locking arms that can be pivotally connected to the latch-engaging portions of the main longitudinal load-supporting bar. The latch mechanism can have a transverse locking latching bar 256 which can extend laterally and transversely between and integrally connect the latches. The locking latch bar can be positioned in the locking bar-receiving slot to securely lock the crane mat carrier when the crane mat carrier is in the upright storage position as shown in FIG. 10. The latch mechanism can include springs 258 (FIGS. 8, 12 and 13) which can be operatively connected to the locking arms for normally urging and biasing the latching bar against the underside of the chassis of the crane. The springs can comprise: coil springs, spiral springs, helical springs, compressions springs, leaf springs, tension springs, or combinations of the preceding springs. In use, the latches providing the locking arms can be pivoted, to longitudinal positions adjacent and against the side portions of the longitudinal load-supporting bar when the crane mat carrier is in the generally horizontal supporting position. At least one and preferably two abutment stop pins 260 (FIG. 4) can extend laterally from the main longitudinal load-supporting bar adjacent the latches providing the locking bars for limiting and controlling upward pivotal movement of the latches.

Figure 9:
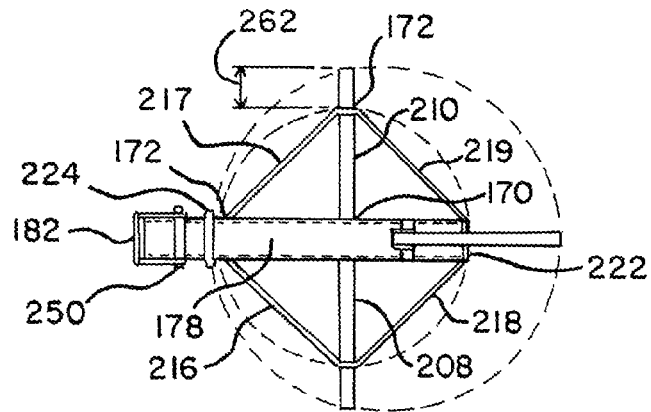
FIG. 9 is a diagrammatic top view of the crane mat carrier with supplemental expandable inserts for expanding the overall support area of the crane mat carrier in accordance with principles of the present invention.

As shown in FIG. 9, the crane mat carrier can have one or more supplemental extendable stabilizer device-supporting inserts 262 to expand the overall support area of the frame assembly for carrying and supporting larger stabilizer devices, e.g. larger crane mats and/or larger crane pads.

The crane mat carrier was able to carry a 2,500 pound load of crane pads on a rough terrain (RT) crane. The crane mat carrier as recited in the pending patent claims produced unexpected surprisingly good results. While the crane mat carrier is particularly useful for RT cranes, it can also be used with other types of cranes, such as: a telescopic crane, tower crane, truck mounted crane, loader crane, overhead crane, wheel mounted crane, wheel-mounted crane with latticework boom, commercial truck-mounted crane with hydraulic boom, commercial truck-mounted crane with articulated boom, commercial truck-mounted crane with trolley boom, crawler mounted latticework boom crane, overhead track-mounted crane, monorail crane, underhung crane, straddle crane, hammerhead tower crane, all-terrain crane, dragline crane, gantry crane, tower crane, industrial crane, truck crane, crawler crane, carry deck crane, jib crane, aircraft carrier crane, stiffleg derrick crane, shipyard crane, loading dock crane, outrigger crane, or combinations of any of the preceding cranes.

The crane-stabilizer devices which can be transported, stored, carried and supported by the crane mat carrier for use with the crane, lifting site, construction site, and/or other job site can comprise one or more of the following: a crane mat, steel crane mat, metal crane mat, wood crane mat, timber crane mat, rubber crane mat, elastomeric crane mat, plastic crane mat, composite crane mat, dunnage crane mat, bridge mat, dragline mat, round crane mat, circular crane mat, oval crane mat, rectangular crane mat, crane mat with handles, crane mat without handles, crane stabilizing mat, protective matting, anti-slip crane mat, outrigger mat, crane pad, crane stabilizer pad, crane pad with handles, crane pad without handles, outrigger pad, steel crane pad, metal crane pad, wood crane pad, timber crane pad, rubber crane pad, elastomeric crane pad, plastic crane pad, composite crane pad, dunnage crane pad, round crane pad, circular crane pad, oval crane pad, rectangular crane pad, or combinations of any of the preceding.

The crane mat carrier can also transport, store, carry and support other items for the items for use with the crane, lifting site, construction site, and/or other job site such as one or more of the following: a wrecking ball, hoist, wheel chocks, wedges, coil handler, lifting beam, adjustable length lifting beam, spreader beam, rotating hook, lifting magnet, crane scale, hood block, sling, shackle, wire rope, rigging, welding equipment, generator, tool box, sheet lifter, cage, skip, plate lifter, ladder, accessories, power tools, construction tools, or combinations of any of the preceding items.

While the crane mat carrier is particularly useful for cranes, it may be desirable in some circumstances to use the crane mat carrier with other construction equipment, such as one or more of the following: a construction vehicle, crane, backhoe loader, tractor, crawler, bulldozer, loader, excavator, forklift, road roller, skid steer, compactor, trencher, grader, agricultural tractor, bulldozer, track skidder, military engineering vehicle, compact excavator, dragline excavator, dredge, reclaimer, steam shovel, suction excavator, trencher, yarder, feller bundler, harvester, skidder, track harvester, wheel forwarder, wheel skidder, pipe layer, fresno scraper, scraper, wheel tractor-scraper, construction tractor, mining tractor, construction truck, mining truck, articulated hauler, articulated truck, water wagon, wheel dozer, soil stabilizer, loader, skip loader, wheel loader, track loader, cherry picker, knuckleboom loader, telescopic handler, asphalt paver, cold paner, cure rig, pneumatic tire compactor, roller, slipform paver, vibratory compactor, stomper, roadheader, tunnel boring machine, underground mining equipment, ballast tamper, drilling machine, pile driver, rotary tiller, lowboy trailer, street sweeper, telescopic lift, scissor lift, man lift, boom lift, compactor, plow, mining equipment, boring equipment, planer, crawler carrier, crawler loader, truck, bucket truck, cab truck, chassis truck, concrete mixer truck, concrete pump truck, digger derrick truck, flat bed truck, flatbed dump truck, fuel truck, lube truck, rollback truck, military truck, logging truck, rolloff truck, sanitation truck, semi-trailer truck, semi-tractor trailer, tanker truck, tow truck, vacuum truck, knuckleboom truck, boom truck, dump truck, service truck, garbage truck, pickup truck, or combinations of any of the preceding.

The crane mat carrier can provide a crane accessory carrying device which can include: (1) a fixed suspension rod and hinge combination; (2) a load distribution/stability plate which contacts underside of the crane; (3) a cantilevered main load carrying tube; (4) a plurality of load stabilizers; (5) a perimeter bar which serves as but is not limited to, bump protection, load securement, and a load stabilizer attachment; (6) a flat upper surface containing a plurality of connectors for specialized accessory carrying attachments; and/or (7) a securing plate so that the crane mat carrier can be operated, removed and reinstalled without tools.

The crane mat carrier can utilize existing or retrofitted drawbar fixture plates which can be attached to many vehicles. Unlike other drawbar plate fixtures, the disclosed crane mat carrier does not need to solely rely on bolt capacity to carry the relatively high vertical load. The bolted securing plate can provide for positional stability of the horizontal portion of the suspension rod and can provide an annular space within which the horizontal portion of the rod is allowed to rotate and act as a hinge. Transfer of load to the drawbar fixture can be via the horizontal portion of the fixed suspension rod by contact between the two surfaces. When used with crane mats, pads and other stabilizer devices, the crane mat carrier can sit low enough that the crane operator can safely stow mats for transport while minimizing lifting and twisting but still maintaining the original crane ground clearance.

The crane mat carrier can have a fixed suspension rod or bar and hinge combination which can enable the crane mat carrier to be disposed and carried in either the deployed or raised position. The crane mat carrier can facilitate clearance to ancillary equipment projecting from rear of the crane when the crane mat carrier is in the upright position. In the suspension rod capacity of the crane mat carrier, loads imparted by accessory loads and forces due to cantilever reaction at the underside of crane can be carried by two vertical arms of the suspension rod (bar) into the horizontal arm of the suspension rod and to the top surface of a drawbar fixture. Limited clearance between the vertical suspension rods and side of the drawbar fixture can prevent any significant undesirable lateral movement.

The crane mat carrier system can have a load distribution and stability plate which can contact the underside of the crane to provide a load reaction contact surface at the underside of the crane thereby allowing stresses in the cantilevered main carrying tube to be minimized and provides rotational stability about the axis of the cantilevered main carrying tube.

The crane mat carrier can also have a cantilevered main load carrying tube which can collect and distribute accessory loads and crane reaction forces to two vertical legs of the suspension rod (bar) and provides a central attachment location for load stabilizers, perimeter bars, and/or a plurality of accessory connectors.

The crane mat carrier can further have a plurality of load stabilizers to secure a load about the axis of main load carrying tube, transfer any tie-down forces to the main tube and securely position the perimeter bar.

Moreover, the crane mat carrier can have a flat perimeter bar which can serve as, but is not limited to: bump protection for personnel; eliminate any acute or sharp corners; provide some deformation on impact; provide load securement for tie-down equipment including, but not limited to, straps, chains, bungee cords, load binders, rope or other securing materials; and provide a surface(s) for a reflector and/or load stabilizer attachment.

The crane mat carrier can have a substantially planar or flat upper surface that can contain a plurality of connectors for specialized accessory carrying attachments. Connectors can be, but are not limited to: twist locks, threaded, welded, riveted or other connectors to facilitate attachment of specialized load securement accessories.

The crane mat carrier system can have a securing plate which can be bolted or otherwise secured to the existing drawbar fixture. The securing plate can serve to provide for positional stability of the horizontal portion of the suspension rod (bar) and can provides an annular space within which the horizontal portion of the rod to allow the bar to rotate and can act as a hinge. The securing plate can permit the crane mat carrier to be removed without tools depending on safety or other design feature requirements of the application or load being carried.

The crane mat carrier is preferably fabricated of metal, but other materials, can be used if desired. Additional, fewer, or alternative components for the crane mat carrier can be provided, if desired. The crane mat carrier can have other attachments. If desired the parts of the crane mat carrier can be shaped differently, such as being triangular, circular, or other irregular shape, larger or smaller than that shown, or can be used in fixed plurality with multiple attachment points to the crane. Uses of the crane mat carrier are not limited to supporting crane accessories, such as: additional hook blocks, crane mats, slings, shackles, wire rope, and other rigging. The crane mat carrier can also be used to transport: welding units, generators, tool boxes, and other equipment which may be required at the lift site or construction site. The crane mat carrier can be useful with equipment that can be carried on either or both ends of the crane. The crane mat carrier can be easily removed from the crane at the lifting site, construction site, or other job site. The crane mat carrier can also be positioned to avoid adversely affecting lifting capacity or stability of the crane under load.

Among the many advantages of the crane mat carrier are:
1. Superior product.
2. Outstanding performance.
3. Superb transporting, holding, carrying, and supporting of crane carrier mats and pads.
4. Easier stacking, stowing, lifting and removing of crane mats and pads.
5. Decreases scratching, scraping and other damage to the crane deck.
6. Reduces crane deck repairs.
7. Avoids lifting crane mats and pads overhead onto the crane deck.
8. Minimizes back pain, muscle strain and injuries to crane operator and crane workers previously resulting from lifting and removal of crane mats and pads from crane decks.
9. Readily transportable.
10. User friendly.
11. Reliable.
12. Compact.
13. Light weight.
14. Portable.
15. Convenient.
16. Easy to install and use.
17. Durable.
18. Economical.
19. Attractive.
20. Efficient.
21. Effective.

Although embodiments of the invention have been shown and described, it is to be understood that various modifications, substitutions, and rearrangements of parts, components, and/or process (method) steps, as well as other uses, shapes, materials, and design of the crane mat carrier can be made by those skilled in the art without departing from the novel spirit and scope of this invention.

What is claimed is:

1. A carrier system for supporting crane mats, comprising:
a crane mat carrier comprising stabilizer device-engaging portions having substantially coplanar stabilizer device-supporting surfaces for transporting, engaging, carrying, and supporting stabilizer devices and other items, said crane mat carrier being movable from and securely positioned at a lower horizontal supporting position, to an intermediate position at an angle of inclination, to an upright storage position and vice versa, said crane mat carrier comprising a frame assembly comprising
an elongated main longitudinal load-supporting bar having a longitudinal load-supporting surface extending a maximum length in a longitudinal direction and a maximum width in a lateral direction, said elongated main longitudinal load-supporting bar having longitudinal side portions, an inner end, a load distribution stability plate abutting against and secured to the inner end, and an outer end positioned opposite the inner end;
crossbars providing lateral load-stabilizing ribs secured to and extending laterally from said longitudinal side portions of said elongated main longitudinal load-supporting bar and having opposite lateral ends, said crossbars each having an upper load-supporting surface with a maximum lateral span in the lateral direction substantially shorter than the maximum length of said longitudinal load-supporting surface of said elongated main longitudinal load-supporting bar in the longitudinal direction and said crossbars having a maximum span in the longitudinal direction substantially less than the maximum width in the lateral direction of said longitudinal load-supporting surface of said elongated main longitudinal load-supporting bar;
perimeter bars comprising diagonal braces connected to the longitudinal side portions of said elongated main load-supporting bar and to the lateral ends of said crossbars to form a generally diamond-shaped periphery, said diagonal braces having upper edges and including outer diagonal braces extending from and connected to the lateral ends of said crossbars and to the outer end of said elongated main longitudinal load-supporting bar; and
said elongated main longitudinal load-supporting bar having an outer portion extending across said diamond-shaped periphery in a longitudinal direction and having an inner portion extending inwardly in a longitudinal direction away from said diamond-shaped periphery;
said longitudinal load-bearing support surface of said elongated main longitudinal load-supporting bar being aligned in coplanar relationship with upper load-supporting surfaces of said crossbars and said upper edges of said diagonal braces of said diamond-shaped periphery to form said coplanar stabilizer device-supporting surfaces,
a latch mechanism comprising spring-loaded latches pivotally connected to the longitudinal side portions of the inner portion of said elongated main longitudinal load-supporting bar and said latch mechanism having a locking latching bar extending laterally between and connecting the spring-loaded latches;
a connection assembly for connecting said crane mat carrier to a chassis of a crane or other construction equipment, said chassis having an underside;
said locking latching bar being urged against and engaging the underside of the chassis when said crane mat carrier is in the intermediate position at an angle of inclination.

2. A carrier system in accordance with claim 1 wherein said connection assembly comprises:
said chassis having a wall extending upwardly and comprising a mounting surface;
a drawbar fixture comprising a backplate secured to the mounting surface;
a mounting plate mounted against the mounting surface of the chassis;
a locking plate securely positioned against said mounting plate; and said locking plate cooperating with said mounting plate and said backplate to define a slot for receiving said locking latching bar when the crane mat carrier is in the upright storage position.

3. A carrier system in accordance with claim 2 wherein said crane mat carrier includes a hanger assembly for hanging said crane mat carrier on the mounting plate and wall of the chassis; and said hanger assembly comprises an inverted generally U-shaped suspension rod connected to the inner portion of said elongated main longitudinal load-supporting bar at a location between said latch mechanism and said diamond-shaped periphery.

4. A carrier system in accordance with claim 1 wherein:
said elongated main longitudinal load-supporting bar comprises a metal bar selected from the group consisting of a tubular bar, channel, solid bar, perforated bar, foraminous bar, rigid bar, and combinations of the preceding; and
said stabilizer devices are selected from the group consisting of a: crane mat, mat, steel mat, metal mat, wood mat, timber mat, rubber mat, elastomeric mat, plastic mat, composite mat, dunnage mat, bridge mat, dragline mat, round mat, circular mat, oval mat, rectangular mat, crane mat with handles, crane mat without handles, crane stabilizing mat, protective matting, anti-slip mat, outrigger mat, crane pad, crane stabilizer pad, crane pad with handles, crane pad without handles, outrigger pad, pad, steel pad, metal pad, wood pad, timber pad, rubber pad, elastomeric pad, plastic pad, composite pad, dunnage pad, round pad, circular pad, oval pad, rectangular pad, and combinations of any of the preceding.

5. A carrier system in accordance with claim 1 wherein:
said crane mat carrier is selected from the group consisting of: a removable crane mat carrier, a detachable pad holder, a carrier assembly, a crane accessory carrying device and combinations thereof;
said frame assembly comprises item-supporting portions;
said items are selected from the group consisting of: a wrecking ball, hoist, wheel chocks, wedges, coil handler, lifting beam, adjustable length lifting beam, spreader beam, rotating hook, lifting magnet, crane scale, hood block, sling, shackle, wire rope, rigging, welding equipment, generator, tool box, sheet lifter, cage, skip, plate lifter, ladder, accessories, power tools, construction tools, and combinations thereof;
said crane is selected from the group consisting of: rough terrain (RT) crane, telescopic crane, tower crane, truck mounted crane, loader crane, overhead crane, wheel mounted crane, wheel-mounted crane with latticework boom, commercial truck-mounted crane with hydraulic boom, commercial truck-mounted crane with articulated boom, commercial truck-mounted crane with trolley boom, crawler mounted latticework boom crane, overhead track-mounted crane, monorail crane, underhung crane, straddle crane, hammerhead tower crane, all-terrain crane, dragline crane, gantry crane, tower crane, industrial crane, truck crane, crawler crane, carry deck crane, jib crane, aircraft carrier crane, stiff-leg derrick crane, shipyard crane, loading dock crane, outrigger crane, and combinations of any of the preceding cranes; and
said construction equipment is selected from the group consisting of: construction vehicle, crane, backhoe loader, tractor, crawler, bulldozer, loader, excavator, forklift, road roller, skid steer, compactor, trencher, grader, agricultural tractor, bulldozer, track skidder, military engineering vehicle, compact excavator, dragline excavator, dredge, reclaimer, steam shovel, suction excavator, trencher, yarder, feller buncher, harvester, skidder, track harvester, wheel forwarder, wheel skidder, pipe layer, fresno scraper, scraper, wheel tractor-scraper, construction tractor, mining tractor, construction truck, mining truck, articulated hauler, articulated truck, water wagon, wheel dozer, soil stabilizer, loader, skip loader, wheel loader, track loader, cherry picker, knuckleboom loader, telescopic handler, asphalt paver, cold paner, cure rig, pneumatic tire compactor, roller, slipform paver, vibratory compactor, stomper, roadheader, tunnel boring machine, underground mining equipment, ballast tamper, drilling machine, pile driver, rotary tiller, lowboy trailer, street sweeper, telescopic lift, scissor lift, man lift, boom lift, compactor, plow, mining equipment, boring equipment, planer, crawler carrier, crawler loader, bucket truck, cab truck, chassis truck, concrete mixer truck, concrete pump truck, digger derrick truck, flat bed truck, flatbed dump truck, fuel truck, lube truck, rollback truck, military truck, logging truck, rolloff truck, sanitation truck, semi-trailer truck, semi-tractor trailer, tanker truck, tow truck, vacuum truck, knuckleboom truck, boom truck, dump truck, service truck, pickup truck, garbage truck, truck, and combinations thereof.

6. A carrier system for supporting crane mats, comprising:
a crane having a chassis with an underside providing a bottom, walls extending upwardly from said bottom, mobile supports for raising and elevating said underside aboveground, said walls including a front wall providing a front end, a back wall providing a back end, and elongated side walls extending between and integrally connecting said ends, each of said walls having a surface, at least one of said surfaces of said crane comprising a mounting surface positioned in proximity to said underside of said crane;
said mobile supports being selected from the group consisting of outriggers, wheeled supports for moving said crane and combinations thereof, said wheeled supports being selected from the group consisting of wheels, tires, crawler tracks, crawler wheels and combinations thereof;
crane-stabilizer devices for positioning below, supporting and stabilizing said mobile supports and said crane when said crane is at a construction site, lifting site, or other job site, said stabilizing devices for positioning on the ground or other surface;
a drawbar fixture comprising a backplate providing a backer plate secured to said mounting surface of said crane, said backplate having an outer backplate surface, a top and a bottom;
a mounting securing plate having an upper securing plate portion with an upper end extending at a height above said top of said backplate and a lower securing plate portion with a lower end positioned at a height above said bottom of said backplate, and an intermediate securing plate portion extending integrally between and connecting said lower securing plate portion and said upper securing plate portion, said mounting securing plate having a back mounting surface facing toward an adjacent end wall of said crane and a front mounting surface facing outwardly away from said adjacent end wall of said crane, said back mounting surface of said intermediate and lower securing plate portions abutting against and secured to said outer backplate surface of said backplate, said upper securing plate portion being spaced outwardly from said mounting surface and said adjacent end wall of said crane and cooperating with said backplate and said adjacent end wall of said crane to form a suspension-rod receiving slot therebetween;

a locking plate having an inner locking plate surface facing inwardly, an outer locking plate surface facing away from said mounting securing plate, a locking plate-abutment portion abutting against and secured to said lower plate portion of said mounting securing plate, and a downwardly extending locking plate portion integrally extending downwardly from said locking plate-abutment portion, said locking plate having a lower edge positioned at a level below said lower end of said mounting securing plate and having an upper edge positioned at a height below the upper end of said mounting securing plate and said top of said backplate, said downwardly ending locking plate portion being spaced from said adjacent end wall of said crane and said backing plate to form a locking bar-receiving slot therebetween;

a load-bearing crane mat carrier comprising substantially coplanar stabilizer device-engaging portions having substantially coplanar stabilizer device-supporting surfaces for transporting, carrying, engaging and supporting said stabilizer devices on said crane, said crane mat carrier being moveable from and secured at different positions to said crane including an upright storage position, an intermediate position at an angle of inclination, and a lower substantially horizontal supporting position, said crane mat carrier comprising a frame assembly providing a loading bearing frame with a load-supporting surface, said frame assembly comprising an elongated main longitudinal load-supporting bar extending longitudinally outwardly from said crane in said lower horizontal supporting position, said longitudinal load-supporting bar having an inner end positioned below said underside of said crane in said lower horizontal supporting position and said elongated main longitudinal load-supporting bar having an outer end positioned opposite said inner end, a load distribution stability plate abutting against and secured to the inner end and engaging against the underside of the chassis when the crane mat carrier is in the lower horizontal position, said longitudinal load-supporting bar having longitudinal side portions and a longitudinal load-supporting surface extending between and integrally connecting said longitudinal side portions, said longitudinal load-supporting surface extending a maximum length in a longitudinal direction and having a maximum width in a lateral direction, said longitudinal load-supporting bar having inner peripheral bars-engaging portions and crossbars-engaging portions positioned between said peripheral bars-engaging portions and said outer end of said longitudinal load-supporting bar, said longitudinal load-supporting bar having hanger sleeve-engaging portions at locations between said inner peripheral bars-engaging portions and said inner end of said longitudinal load-supporting bar, and said longitudinal load-supporting bar having latch-engaging portions at locations between said hanger sleeve-engaging portions and said inner end of said longitudinal load-supporting bar;

crossbars providing lateral load-stabilizing ribs secured to and extending laterally from said crossbars-engaging portions of said longitudinal load-supporting bar between said inner and outer ends, said crossbars having opposite lateral ends, said crossbars each having an upper load-supporting surface with a maximum lateral span in the lateral direction substantially shorter than the maximum length of said longitudinal load-supporting surface of said elongated main longitudinal load-supporting bar in the longitudinal direction and said crossbar having a maximum span in the longitudinal direction substantially less than the maximum width in the lateral direction of said longitudinal load-supporting surface of said elongated main longitudinal load-supporting bar; and perimeter bars providing a generally diamond-shaped periphery, said perimeter bars comprising diagonal braces having upper edges and including inner diagonal braces extending between and connecting the lateral ends of said crossbars to and converging towards said inner peripheral bars-engaging portions of said elongated main longitudinal load-supporting bar and including outer diagonal braces extending between and connecting the lateral ends of said crossbars to said outer end of said elongated main longitudinal load-supporting bar;

said longitudinal load-supporting surface of said elongated main longitudinal load-supporting bar cooperating with and being positioned in coplanar relationship with said upper load-supporting surfaces of said crossbars and said upper edges of the diagonal braces of said perimeter bars of said diamond-shaped periphery to provide said substantially coplanar stabilizer device-engaging portions with said substantially coplanar stabilizer device-supporting surfaces for holding, carrying and supporting said crane-stabilizer devices;

said elongated main longitudinal load-support bar having an outer portion extending across said diamond-shaped periphery in a longitudinal direction and having an inner portion extending inwardly in a longitudinal direction away from said diamond-shaped periphery;

a hanger assembly for hanging and supporting said crane mat carrier on said backing plate, said mounting securing plate and said adjacent end wall of said crane; said hanger assembly comprising an inverted generally U-shaped hanger providing an inverted generally U-shaped suspension rod, said hanger having hangerlegs extending downwardly when said crane mat carrier is in said lower generally horizontal supporting position and having an transverse suspension hanger bar extending laterally between and integrally connecting said legs and positioned in said suspension-rod receiving slot, said legs having externally threaded lower leg portions, said hanger assembly having tubular hanger sleeves secured to said hanger sleeve-engaging portions of said longitudinal load-supporting bar and positioned generally upwardly when said crane mat carrier is in said generally horizontal supporting position, said hanger sleeves having upper sleeve portions and lower sleeve portions, said tubular hanger sleeves defining leg-openings for receiving said lower leg portions, and said hanger assembly having internally threaded hanger adjustment nuts for engaging and securing said lower legs portions against said upper and lower sleeve portions; and a latch mechanism for securing locking and supporting said crane mat carrier against a bottom portion of said back plate, said mounting securing plate and said adjacent end wall of said crane when said crane mat carrier is in said upright storage position, said latch mechanism comprising spring-loaded latches providing locking arms pivotally connected to said latch-engaging portions of said longitudinal load-supporting bar and having an transverse locking latching bar extending laterally between and integrally connecting said latches and positioned in said locking bar-receiving slot to securely lock said crane mat carrier when said crane mat carrier is in said upright storage position, and said latch mechanism including springs operatively associated with said locking arms for normally urging and biasing said latching bar against the underside of said chassis of said crane when said crane mat carrier is in said intermediate position at an angle of inclination, said latches being pivotable to longitudinal positions adjacent and against said longitudinal side portions of said elongated main longitudinal load-supporting bar when said crane mat carrier is in said lower supporting position, and at least one abutment stop pin extending laterally from said longitudinal load-supporting bar adjacent said latches for limiting and controlling pivotal movement of said locking arms.

7. A carrier system in accordance with claim 6 including:

fasteners for securely fastening said intermediate securing plate portion to said backplate; detent pins comprising pull pins with rings for detachably securing said suspension rod in said suspension-rod receiving slot;

said intermediate securing plate portion defining fastener-receiving openings for receiving said fasteners;

said upper securing plate portion defining detent openings for receiving said detent pins;

said outer diagonal braces of said diamond-shaped periphery having outer surfaces with indicia thereon comprising reflectors for enhanced visibility and viewing of said crane mat carrier in said lower horizontal supporting position;

said frame having openings providing passageways between said peripheral bars, crossbars and said longitudinal bar for decreasing the weight of said crane mat carrier and accommodating passage of air and debris;

said elongated main longitudinal load-supporting bar and crossbars comprise tubular bars;

said frame assembly comprises item-supporting portions;

said items are selected from the group consisting of: a wrecking ball, hoist, wheel chocks, wedges, coil handler, lifting beam, adjustable length lifting beam, spreader beam, rotating hook, lifting magnet, crane scale, hood block, sling, shackle, wire rope, rigging, welding equipment, generator, tool box, sheet lifter, cage, skip, plate lifter, ladder, accessories, power tools, construction tools, and combinations thereof;

said springs in said latch mechanism are selected from the group consisting of coil springs, spiral springs, helical springs, compressions springs, leaf springs, tension springs, and combinations of the preceding springs;

said crane mat carrier comprises a removable crane mat carrier; and said crane mat carrier includes an extendable stabilizer device-supporting insert for expanding the overall support area of said frame assembly for carrying and supporting larger stabilizer devices.

8. A carrier system in accordance with claim 6 wherein:

said crane-stabilizer devices are selected from the group consisting of: a crane mat, steel crane mat, metal crane mat, wood crane mat, timber crane mat, rubber crane mat, elastomeric crane mat, plastic crane mat, composite crane mat, dunnage crane mat, bridge mat, dragline mat, round crane mat, circular crane mat, oval crane mat, rectangular crane mat, crane mat with handles, crane mat without handles, crane stabilizing mat, protective matting, anti-slip crane mat, outrigger mat, crane pad, crane stabilizer pad, crane pad with handles, crane pad without handles, outrigger pad, steel crane pad, metal crane pad, wood crane pad, timber crane pad, rubber crane pad, elastomeric crane pad, plastic crane pad, composite crane pad, dunnage crane pad, round crane pad, circular crane pad, oval crane pad, rectangular crane pad, and combinations of any of the preceding; and said crane is selected from the group consisting of: a rough terrain (RT) crane, telescopic crane, tower crane, truck mounted crane, loader crane, overhead crane, wheel mounted crane, wheel-mounted crane with latticework boom, commercial truck-mounted crane with hydraulic boom, commercial truck-mounted crane with articulated boom, commercial truck-mounted crane with trolley boom, crawler mounted latticework boom crane, overhead track-mounted crane, monorail crane, underhung crane, straddle crane, hammerhead tower crane, all-terrain crane, dragline crane, gantry crane, tower crane, industrial crane, truck crane, crawler crane, carry deck crane, jib crane, aircraft carrier crane, stiff-leg derrick crane, shipyard crane, loading dock crane, outrigger crane, and combinations of any of the preceding cranes.

9. A carrier system for supporting crane mats, comprising:

a crane having a chassis with an underside providing a bottom, walls extending upwardly from said bottom, crane supports for raising and elevating said underside aboveground, said walls including a front wall providing a front end, a back wall providing a back end, and elongated side walls extending between and integrally connecting said ends, each of said walls having a surface, at least one of said surfaces of said ends of said crane comprising a mounting surface positioned in proximity to said underside of said crane;

said crane supports being selected from the group consisting of outriggers, wheeled supports for moving said crane- and combinations thereof, said wheeled supports being selected from the group consisting of wheels, tires, crawler tracks, crawler wheels and combinations thereof;

crane-stabilizer devices for positioning below, supporting and stabilizing said crane supports and said crane when said crane is at a construction site, said stabilizing devices for positioning on the ground or other surface;

a drawbar fixture comprising a backplate providing a backer plate secured to said mounting surface of said crane, said backplate having an outer backplate surface, a backplate top and a backplate bottom;

a mounting securing plate having an upper securing plate portion with an upper end extending at a height above said top of said backplate and a lower securing plate portion with a lower end positioned at a height above said bottom of said backplate, and an intermediate securing plate portion extending integrally between and connecting said lower securing plate portion and said upper securing plate portion, said mounting securing plate having a back mounting surface facing toward an adjacent end wall of said crane and a front mounting surface facing outwardly away from said adjacent end wall of said crane, said back mounting surface of said intermediate and lower securing plate portions abutting against and secured to said outer backplate surface of said backplate, said upper securing plate portion being spaced outwardly from said mounting surface and said adjacent end wall of said crane and cooperating with said backplate and said adjacent end wall of said crane to form a suspension-rod receiving slot therebetween;

a locking plate having an inner locking plate surface facing inwardly, an outer locking plate surface facing away from said mounting securing plate, a locking plate-abutment portion abutting against and secured to said lower plate portion of said mounting securing plate, and a downwardly extending locking plate portion integrally extending downwardly from said locking plate-abutment portion, said locking plate having a lower edge positioned at a level below said lower end of said mounting securing plate and having an upper edge positioned at a height below the upper end of said mounting securing plate and said top of said backplate, said downwardly ending locking plate portion being spaced from said adjacent end wall of said crane and said backing plate to form a locking bar-receiving slot therebetween;

a load-bearing crane mat carrier having substantially coplanar stabilizer device-engaging portions with substantially coplanar stabilizer device-supporting surfaces for transporting, holding, carrying, engaging and supporting said stabilizer devices on said crane, said crane mat carrier being moveable and secured at different position including an upright storage position, an intermediate position at an angle of inclination, and to a generally horizontal supporting position, said crane mat carrier comprising a frame assembly providing a loading bearing frame with a load-supporting surface, said frame assembly comprising an elongated main longitudinal load-supporting bar extending longitudinally outwardly and cantilevered from said crane in said lower horizontal supporting position, said longitudinal load-supporting bar having an inner end positioned below said underside of said crane in said lower horizontal supporting position and having an outer end positioned opposite said inner end, a load distribution stability plate abutting against and secured to said inner end, said elongated main longitudinal load-supporting bar having longitudinal side portions and a longitudinal load-supporting surface extending between and integrally connecting said longitudinal side portions, said longitudinal load-supporting surface extending a maximum length in a longitudinal direction and having a maximum width in a lateral direction and engaged against the underside of the chassis of the crane when the crane mat carrier is in the lower horizontal position, said longitudinal load-supporting bar having inner peripheral bars-engaging portions and crossbars-engaging portions positioned between said peripheral bars-engaging portions and said outer end of said longitudinal load-supporting bar, said longitudinal load-supporting bar having hanger sleeve-engaging portions at locations between said inner peripheral bars-engaging portions and said inner end of said longitudinal load-supporting bar, and said longitudinal load-supporting bar having said longitudinal load-supporting bar having latch-engaging portions at locations between said hanger sleeve-engaging portions and said inner end of said longitudinal load-supporting bar;

crossbars providing lateral load-stabilizing ribs secured to and extending laterally from said crossbars-engaging portions of said longitudinal side portions of said elongated main longitudinal load-supporting bar between said inner and outer ends, said crossbars having opposite lateral ends, said crossbars each having an upper load-supporting surface with a maximum lateral span in the lateral direction substantially shorter than the maximum length of said longitudinal load-supporting surface of said elongated main longitudinal load-supporting bar in the longitudinal direction and said crossbar having a maximum span in the longitudinal direction substantially less than the maximum width in the lateral direction of said longitudinal load-supporting surface of said elongated main longitudinal load-supporting bar; and perimeter bars providing a generally diamond-shaped periphery, said perimeter bars comprising diagonal braces including inner diagonal braces extending between and connecting the lateral ends of said crossbars to and converging towards said inner peripheral bars-engaging portions of said longitudinal load-supporting bar and including outer diagonal braces extending between and connecting the lateral ends of said crossbars to said outer end of said longitudinal load-supporting bar;

said longitudinal load-supporting surface of said elongated main longitudinal load-supporting bar being positioned in coplanar alignment with the upper load-supporting surfaces of said crossbars and the upper edges of said diagonal braces of said perimeter bars to provide said coplanar substantially coplanar stabilizer device-engaging portions providing said substantially coplanar stabilizer device-supporting surfaces for holding, carrying and supporting said crane-stabilizer devices;

said elongated main longitudinal load-support bar having an outer portion extending across said diamond-shaped periphery in a longitudinal direction and having an inner portion extending inwardly in a longitudinal direction away from said diamond-shared periphery;

a hanger assembly for hanging and supporting said crane mat carrier on said backing plate, said mounting securing plate and said adjacent end wall of said crane; said hanger assembly comprising an inverted generally U-shaped hanger providing an inverted generally U-shaped suspension rod, said hanger having hanger-legs extending downwardly when said crane mat carrier is in said lower generally horizontal supporting position and having an transverse suspension hanger bar extending laterally between and integrally connecting said legs and positioned in said suspension-rod receiving slot, said legs having externally threaded lower leg portions, said hanger assembly having tubular hanger sleeves secured to said hanger sleeve-engaging portions of said longitudinal load-supporting bar and positioned generally upwardly when said crane mat carrier is in said generally horizontal supporting position, said hanger sleeves having upper sleeve portions and lower sleeve portions, said tubular hanger sleeves defining leg-openings for receiving said lower leg portions, and said hanger assembly having internally threaded hanger adjustment nuts for engaging and securing said lower legs portions against said upper and lower sleeve portions; and a safety latch mechanism for securing locking and supporting said crane mat carrier against a bottom portion of said back plate, said mounting securing plate and said adjacent end wall of said crane when said crane mat carrier is in said upright storage position, said safety latch mechanism comprising spring-loaded latches providing locking arms pivotally connected to said latch-engaging portions of said longitudinal side portions of said elongated main longitudinal load-supporting bar and having an transverse locking latching bar extending laterally between and integrally connecting said latches and positioned in said locking bar-receiving slot to securely lock said crane mat carrier when said crane mat carrier is in said upright storage position, and said latch mechanism including springs operatively connected to said locking arms for normally urging and biasing said latching bar against the underside of said chassis when said crane mat carrier is in said intermediate position at an angle of inclination, said latches being pivotable to longitudinal positions adjacent and against said side portions of said longitudinal load-supporting bar when said crane mat carrier is in said lower generally horizontal supporting position, and at least one abutment stop pin extending laterally from said longitudinal load-supporting bar adjacent said latches for limiting and controlling upward pivotal movement of said latches.

10. A carrier system in accordance with claim 9 including:
said crane mat carrier includes extendable stabilizer device-supporting inserts for expanding the overall support area of said frame assembly for carrying and supporting larger stabilizer devices;
fasteners comprising bolts for securely fastening said intermediate securing plate portion to said backplate;
detent pins comprising pull pins with finger-graspable rings for detachably securing said suspension rod in said suspension-rod receiving slot;
said intermediate securing plate portion defining fastener-receiving openings for receiving said fasteners;
said upper securing plate portion defining detent openings for receiving said detent pins;
said outer diagonal braces of said diamond-shaped periphery having outer surfaces with indicia thereon providing reflectors for enhanced visibility and viewing of said crane mat carrier in said lower horizontal supporting position;
said frame having generally triangular openings providing generally triangular passageways between said peripheral bars, crossbars and said longitudinal bar for decreasing the weight of said crane mat carrier and accommodating passage of air and debris;
said elongated main longitudinal a load-supporting bar and crossbars comprise tubular bars;
said springs in said latch mechanism are selected from the group consisting of coil springs, spiral springs, helical springs, compressions springs, leaf springs, tension springs, and combinations of the preceding springs; and
said crane mat carrier comprising a removable crane mat carrier.

11. A carrier system in accordance with claim 9 wherein:
said crane is selected from the group consisting of a rough terrain (RT) crane, telescopic crane, tower crane, truck mounted crane, loader crane, overhead crane, wheel mounted crane, wheel-mounted crane with latticework boom, commercial truck-mounted crane with hydraulic boom, commercial truck-mounted crane with articulated boom, commercial truck-mounted crane with trolley boom, crawler mounted latticework boom crane, overhead track-mounted crane, monorail crane, underhung crane, straddle crane, hammerhead tower crane, all-terrain crane, dragline crane, gantry crane, tower crane, industrial crane, truck crane, crawler crane, carry deck crane, jib crane, aircraft carrier crane, stiff-leg derrick crane, shipyard crane, loading dock crane, outrigger crane, and combinations of any of the preceding cranes; and
said crane-stabilizer devices are selected from the group consisting of a crane mat, steel crane mat, metal crane mat, wood crane mat, timber crane mat, rubber crane mat, elastomeric crane mat, plastic crane mat, composite crane mat, dunnage crane mat, bridge mat, dragline mat, round crane mat, circular crane mat, oval crane mat, rectangular crane mat, crane mat with handles, crane mat without handles, crane stabilizing mat, protective matting, anti-slip crane mat, outrigger mat, crane pad, crane stabilizer pad, crane pad with handles, crane pad without handles, outrigger pad, steel crane pad, metal crane pad, wood crane pad, timber crane pad, rubber crane pad, elastomeric crane pad, plastic crane pad, composite crane pad, dunnage crane pad, round crane pad, circular crane pad, oval crane pad, rectangular crane pad, and combinations of any of the preceding.

\* \* \* \* \*